US007865026B2

(12) United States Patent
Chen et al.

(10) Patent No.: US 7,865,026 B2
(45) Date of Patent: Jan. 4, 2011

(54) DATA REUSE METHOD FOR BLOCKING MATCHING MOTION ESTIMATION

(75) Inventors: Liang Gee Chen, Taipei (TW); Chao Tsung Huang, Taipei (TW); Ching Yeh Chen, Taipei (TW); Yi Hau Chen, Taipei (TW)

(73) Assignee: National Taiwan University, Taipei (TW)

( * ) Notice: Subject to any disclaimer, the term of this patent is extended or adjusted under 35 U.S.C. 154(b) by 1519 days.

(21) Appl. No.: 11/219,720

(22) Filed: Sep. 7, 2005

(65) Prior Publication Data

US 2007/0053439 A1    Mar. 8, 2007

(51) Int. Cl.
*G06K 9/46* (2006.01)
(52) U.S. Cl. .................................. 382/236; 375/240.24
(58) Field of Classification Search ............ 375/240.24; 382/236
See application file for complete search history.

(56) References Cited

PUBLICATIONS

Huang et al., Memory Analysis of VLSI Architecture for 5/3 and 1/3 Motion-Compensated Temporal Filtering, Mar. 18-23, 2005, IEEE International Conference on Acoustices, Speech, and Signal Processing, 2005, vol. 5,pp. V-93 thru V-96.*
Tuan et al., On the Data REuse and Memory Bandwidth Analysis for Full-Search Block-Matching VLSI Architecture, Jan. 2002, IEEE Transactions on Circuits and Systems for Video Technology, vol. 12, No. 1, pp. 61-72.*
Su et al., Motion Estimation Methods for Overlapped Block Motion Compensation, IEEE Transactions on Image Processing, Sep. 2000, vol. 9, No. 9, pp. 1509-1521.*
Hang et al., Motion Estimation for Video Coding Standards, 1997, Kluwer Academic Publishers: Journal of VLSI Signal Processing, vol. 17, pp. 113-136.*

* cited by examiner

*Primary Examiner*—Brian P Werner
*Assistant Examiner*—Dennis Rosario
(74) *Attorney, Agent, or Firm*—Bacon & Thomas, PLLC

(57) ABSTRACT

A data reuse method with level C+ for block matching motion estimation is disclosed. Compared to conventional Level C scheme, this invention can save large external memory bandwidth of motion estimation. The main idea is to reuse the overlapped searching region in the horizontal direction and partially reuse the overlapped searching region in the vertical direction. Several vertical successive current macroblocks are stitched, and the searching region of these current macroblocks is loaded, simultaneously. With the small overhead of internal memory, the reduction of external memory bandwidth is large. By case studies of H.264/AVC, the level C+ scheme can provide a good trade-off between the conventional Level C and D scheme.

4 Claims, 4 Drawing Sheets

DATA REUSE METHOD FOR BLOCKING MATCHING MOTION ESTIMATION

FIELD OF THE INVENTION

This invention relates to a data reuse method of motion estimation, and more particularly to a data reuse method of motion estimation for effectively reducing the requirement of bandwidth for external frame memory and preventing from influencing the result of motion estimation.

BACKGROUND OF THE INVENTION

Recently, the techniques of very large scale integrated circuits (VLSI) design are developed very fast. More and more process units for multimedia are disclosed consecutively. Meanwhile, the video process unit is more attractive because it has to introduce huge transmitting bandwidth and video storing memory for working. Therefore, there are several multimedia standards, such as H.261, H.263, H.263+, H.263++, MPEG-1-MPEG-2, MPEG-4, H.264/AVC and so on, are disclosed for reducing the requirements of transmitting bandwidth and video storing memory. However, those multimedia-processing methods should be executed via a large number of operations and huge external frame memory. Accordingly, in those above system, the process of motion estimation should be the core technique because it could remove the temporal redundancy in the video sequence for achieving the highest compression ratio. Certainly, the process of motion estimation would also occupy the greater part of operations and the memory of bandwidth because that process has to compare a large number of candidate blocks. For comparing those candidate blocks, a huge bandwidth of external frame memory should be introduced. Generally speaking, the system for motion estimation could be simply illustrated as FIG. 1. The huge bandwidth of external frame memory is introduced and that will cause the power consumption of the system bus to be increased. Therefore, it needs to provide a data reuse method of motion estimation for effectively reducing the requirement of bandwidth for external frame memory and preventing from influencing the result of motion estimation.

Presently, a common method of block matching algorithm is applied for motion estimation. Furthermore, a data reuse method of searching region with four levels ranged from A to D is disclosed and applied in a hardware accelerator to load the data of searching region for the comparison of motion estimation. (Referring to Mei-Yun Hsu, "Saclable module-based architecture for MPEG-4 BMA motion estimation," M.S. thesis, National Taiwan Univ., June 2000; and J.-C. Tuan, T.-S. Chang, and C.-W. Jen, "On the data reuse and memory bandwidth analysis for full-search block-matching VLSI architecture," IEEE Trans. CSVT, vol. 12, no. 1, pp. 61-72, January 2002.) Meanwhile, data reuse method of level C introduces a block matching by means of respectively comparing two horizontal and consecutive blocks to the overlapped blocks of the searching range. This method provides the good states of internal memory and external frame memory simultaneously and is usually applied in a hardware accelerator of motion estimation. However, in practice, the high-resolution video tends to be popularized and the application of level C won't to be suitable for use anymore. For HDTV 1280×720 with 30 frames in per second, the searching range in horizontal direction has the hardware accelerator as [−128,128] and huge bandwidth of 536 MByte/s for external frame memory should be introduced when the data reuse method with level C is put in use. Thus, the system loading would be increased. Therefore, it needs to provide a data reuse method of motion estimation, which is capable of effectively reducing the requirement of bandwidth for external frame memory, preventing from influencing the result of motion estimation, and can rectify those drawbacks of the prior art and solve the above problems. The present invention discloses a data reuse method of motion estimation for effectively reducing the requirement of bandwidth for external frame memory and preventing from influencing the result of motion estimation, thereby being novel and practical.

SUMMARY OF THE INVENTION

This paragraph extracts and compiles some features of the present invention; other features will be disclosed in the follow-up paragraph. It is intended to cover various modifications and similar arrangements included within the spirit and scope of the appended claims, and this paragraph also is considered to refer.

It is an object of the present invention to provide a data reuse method of motion estimation with level C+ data reuse method for completely reusing overlapped searching region in the horizontal direction while the total searching region of each block is loaded, and partly reusing the overlapped searching region in the vertical direction, thereby the method with level C+ data reuse method saving more bandwidth for external frame memory than that of C data reuse method does, wherein a small internal memory size is increased merely.

In accordance with an aspect of the present invention, the data reuse method with level C+ includes steps of introducing blocks for motion estimation; using a region overlapped in the horizontal direction and the vertical direction corresponding to a searching region of adjacent blocks for reducing loading data from an external frame memory; and storing temporarily data of said searching region for motion estimation into an internal memory, thereby $B_H \times (SRv + n \times Bv - 1)$ pixels being loaded from said external frame memory for n consecutive blocks in the vertical direction, where n is a natural number and larger than 1, $B_H$ is a width of said block in the horizontal direction, Bv is a height of said block in the vertical direction, and SRv is a pixel-searching range in the vertical direction of said block.

Preferably, said internal memory has a capacity adjusted with a scheduling of motion estimation in a video encoder.

Preferably, said external frame memory further connects with a system bus when said motion estimation is performed.

Preferably, said internal memory is a direct-connecting memory device when said motion estimation is performed.

In accordance with another aspect of the present invention, a data reuse method for block matching motion estimation includes steps of (a) loading a searching region of a first side of a present frame corresponding to n consecutive blocks in the vertical direction from an external frame memory and storing said searching region into an internal memory, wherein n is a natural number and larger than 1; (b) executing a motion estimation and a motion compensation of said n consecutive blocks in the vertical direction; (c) horizontally shifting blocks for enabling next n vertically consecutive blocks as processing blocks; (d) obtaining a new searching region corresponding to said processing blocks in the vertical direction, and then loading said new searching region from said external frame memory and storing said new searching region into said internal memory; (e) repeating step (c) and step (d) till a second side of said present frame are enabled as proceeding blocks, and then downward shifting blocks for enabling next n blocks in the vertical direction as processing blocks; and (f) repeating step (a) till said present frame is processed completely.

Certainly, said first side can be a leftmost side of the frame.

Certainly, said second side can be a rightmost side of the frame.

Certainly, said horizontally shifting can be rightward shifting.

Preferably, said internal memory has a capacity adjusted with a scheduling of motion estimation in a video encoder.

Preferably, said external frame memory further connects with a system bus when said motion estimation is performed.

Certainly, said internal memory can be a direct-connecting memory device when said motion estimation is performed.

Preferably, said step (a) is performed via an equation of $B_H \times (SRv + n \times Bv - 1)$, wherein n is a natural number and larger than 1, $B_H$ is a width of said block in the horizontal direction, Bv is a height of said block in the vertical direction, and SRv is a pixel-searching range in the vertical direction of said block.

Preferably, said present frame includes 1280×720 pixels.

Certainly, said present frame is loaded in a speed of 1/30 second per frame.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

The present invention discloses a data reuse method of block matching motion estimation, and the objects and advantages of the present invention will become more readily apparent to those ordinarily skilled in the art after reviewing the following detailed description. The present invention needs not be limited to the following embodiment.

The preferred embodiment of the present invention is described as the following four paragraphs:

1. Block Matching Motion Estimation Algorithm

Figure 1:
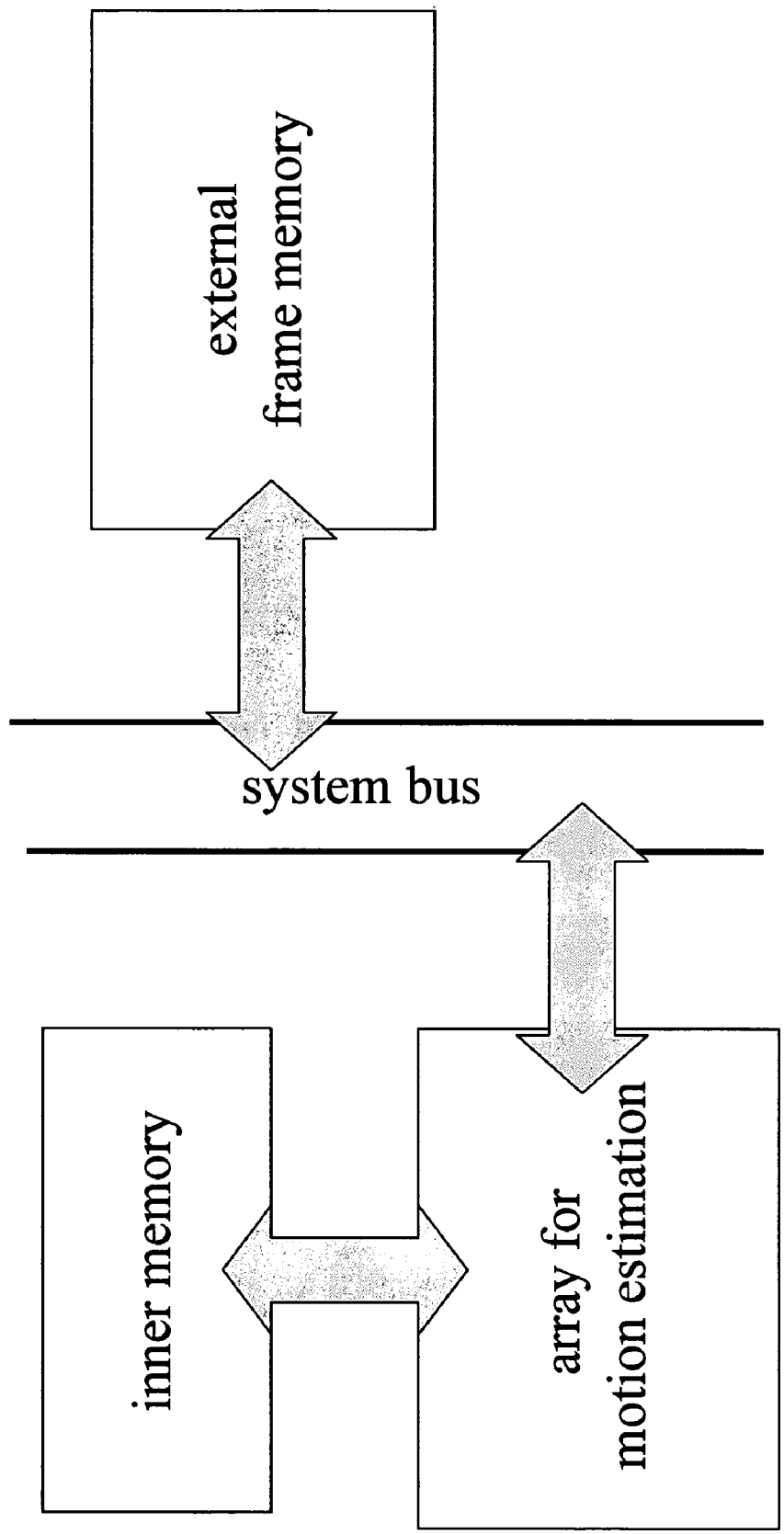
FIG. 1 illustrates the related system with array for motion estimation, internal memory, external frame memory, and system bus in normal condition.
Figure 2:
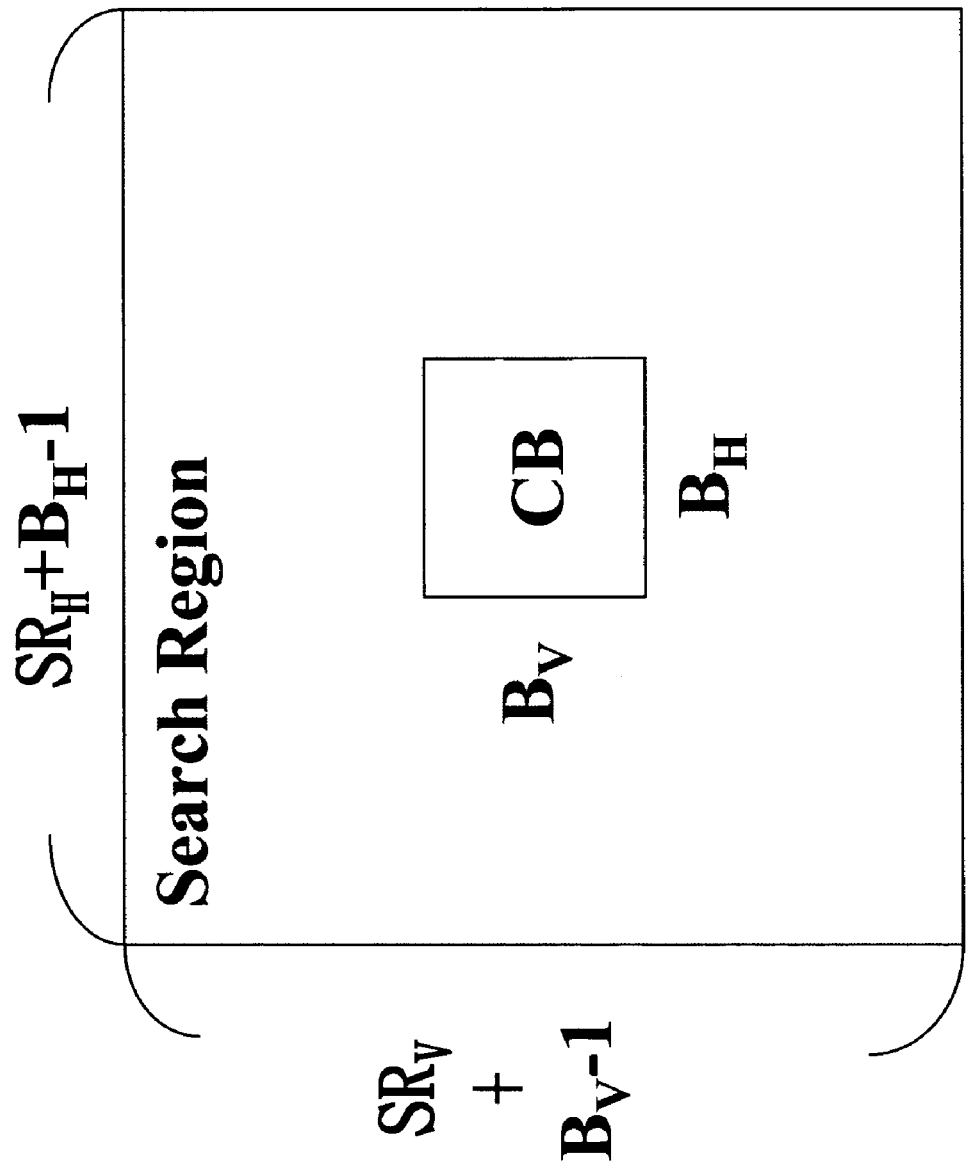
FIG. 2 illustrates a present block and a corresponding searching region thereof in block matching motion estimation algorithm according to the present invention.

The block matching motion estimation algorithm can be obtained via the following equation:

$$SAD(m, n) = \sum_{i=0}^{B_H-1} \sum_{j=0}^{B_V-1} |c(i, j) - s(i+m, j+n)| \quad (1)$$

$$MV = \{(u, v) | SAD(u, v) \leq SAD(m, n), -P_H \leq m,$$

$$u \leq P_H - 1, -P_V \leq n, v \leq P_V - 1, (m, n) \in SP\}$$

wherein, $\{c(x,y) | 0 \leq x \leq B_H-1, 0 \leq y \leq B_V-1\}$ is the present block data, $\{s(x,y) | -P_H \leq x \leq P_H+B_H-2, -P_V \leq y \leq P_V+B_V-2\}$ is the search area data, $B_H \times B_V$ is the size of block, $-P_H \sim P_H-1$ is the searching range in the horizontal direction, $-P_V \sim P_V-1$ is the searching range in the horizontal direction, and $B_H$, $B_V$, $P_H$, and $P_V$ are positive integers. The related searching regions are illustrated in FIG. 2. SP is search pattern obtained by comparing candidate blocks via different motion estimation algorithm, and MV is motion vector detected therein and has the smallest SAD (sum of absolute differences) value of the searching position in response to the adopted motion estimation algorithm. The physical significance of that means framing a searching region of the previous frame (or the following frame) corresponding to the position around the present block of the present frame and finding out the most similar block from the previous frame (or the following frame) corresponding to the present block by the motion estimation algorithm. Meanwhile, the similarity could be determined via the SAD value of equation (1). In other words, the intensity of each pixel in present block is compared to and subtracted from that of each related pixel in candidate block of searching position (m, n) for obtaining $(B_H \times B_V)$ values. Furthermore, each absolute value of $(B_H \times B_V)$ values is summed up. Accordingly, the smaller SAD value is, the more similar between the present block and the candidate block is.

2. Data Reuse Method for Searching Region

For different block matching motion estimation algorithm, the number of candidate blocks for searching via the algorithm is different. In full-search block matching algorithm, total candidate blocks are introduced to be compared, and total searching region corresponding to present block is loaded. However in other quick block matching algorithm, such as three-stage-search block matching algorithm or diamond-search block matching algorithm, the number of candidate blocks for searching is different, and the algorithm might load total searching blocks or merely load candidate blocks. Moreover, when the algorithm tends to load candidate blocks merely, the bandwidth of external frame memory would vary with the block matching algorithm. Sometime, the bandwidth introduced by the quick block matching algorithm is even wider than that of full-search block matching algorithm. In the preferred embodiment of the present invention, the full-search block matching algorithm is introduced for illustrating the reuse scheme.

Four data reuse methods with levels ranged from A to D are disclosed to utilize consecutive candidate blocks. Meanwhile, the discrimination between good and bad data reuse methods is usually determined according to the size of internal memory and the width of loading bandwidth for external frame memory.

Figure 3:
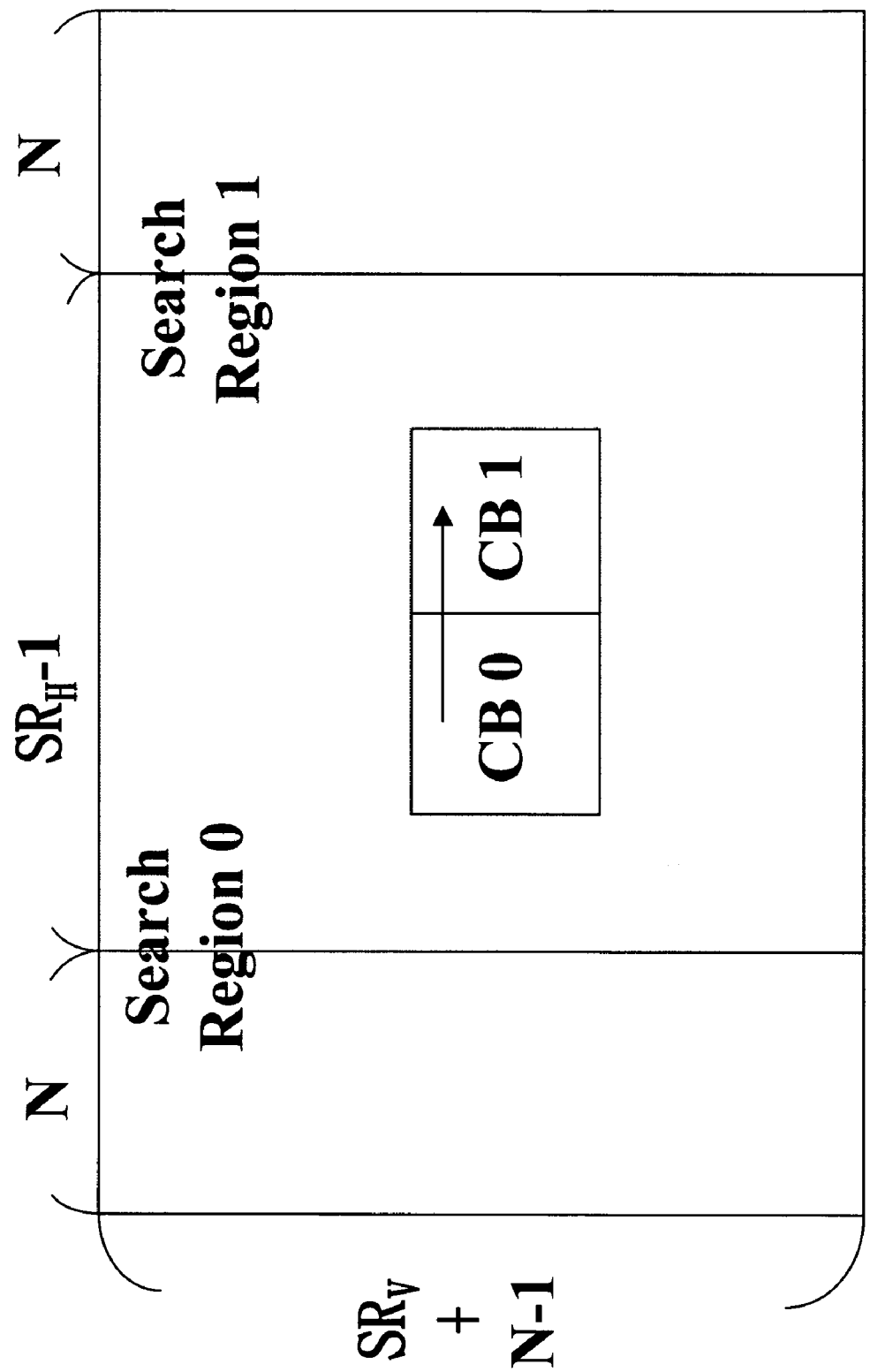
FIG. 3 illustrates a data reuse method with level C in full-search block matching algorithm according to the embodiment of the present invention.

Data reuse methods with levels A and B tend to utilize the searching region of single present block for data reusing. Meanwhile, the data reuse method with level A only utilizes overlapped parts of consecutive candidate blocks in horizontal direction; and the data reuse method with level B utilizes overlapped parts of consecutive candidate blocks in horizontal and vertical direction simultaneously. Furthermore, Data reuse methods with levels C and D tend to utilize the searching region of several present blocks for data reusing. Meanwhile, FIG. 3 illustrates data reuse method with level C, wherein reusing parts are illustrated as dark gray therein. Therefore, when a searching region data is loaded for the present block by the raster scan according to the traditional standard of coding audio-visual information, the region in right side of light gray in FIG. 3 is loaded merely, wherein the region includes $B_H \times (SRv+Bv-1)$ pixels. The size of the internal memory for storing referred frame in data reuse method with level C could be determined according to the practice of motion estimation. If we define the size of the present block as the related searching region, which includes $(SR_H+B_H-1) \times (SRv+Bv-1)$ pixels, the process of motion compensation can be executed after the process of motion estimation without introducing extra bandwidth for external frame memory. The data reuse method with level D has the smallest bandwidth for external frame memory, because the overlapped region of the searching region in horizontal and vertical direction corresponding to adjacent present blocks can be reused completely. However, the data reuse method with level D should introduce a huge internal memory having size, $(W+SR_H-1) \times (SRv-1)$, in proportion to the width of a frame, wherein $B_H$ is the width of block in horizontal direction, Bv is the height of block in vertical direction, SRv is pixel-searching range in vertical direction of block, $SR_H$ is pixel-searching range in horizontal direction of block, and W is the pixel number of the width of frame.

3. Data Reuse Method with Level C+ According to the Present Invention

The present invention discloses a data reuse method with level C+, which is capable of using stripe scan instead of raster scan for rectifying drawbacks of the prior art, and reducing the requirement of bandwidth for external frame memory to be less than that of data reuse method with level C. According to the spirit and scope of the present invention, the data reuse method with level C+ completely reuses overlapped searching region in the horizontal direction while the total searching region of each block is loaded, and partly reused the overlapped searching region in the vertical direction. The detail data reuse method with level C+ is described as the following:

(1) loading a searching region of leftmost parts of frame corresponding to n consecutive blocks in vertical direction from an external frame memory and storing it into an internal memory;

(2) executing motion estimation and motion compensation of the n consecutive blocks in vertical direction;

(3) rightward shifting blocks for enabling the next right blocks as processing blocks;

(4) obtaining a new searching region corresponding to n consecutive blocks in vertical direction, wherein the new searching region has not be stored in the internal memory yet; and then loading the new searching region from the external frame memory and storing it into the internal memory;

(5) repeating step (3) and step (4) till the rightmost parts of frame are enabled as proceeding blocks; and then downward shifting n blocks for enabling the next n blocks as processing blocks; and (6) repeating step (1) till the present frame is processed completely.

Figure 4:
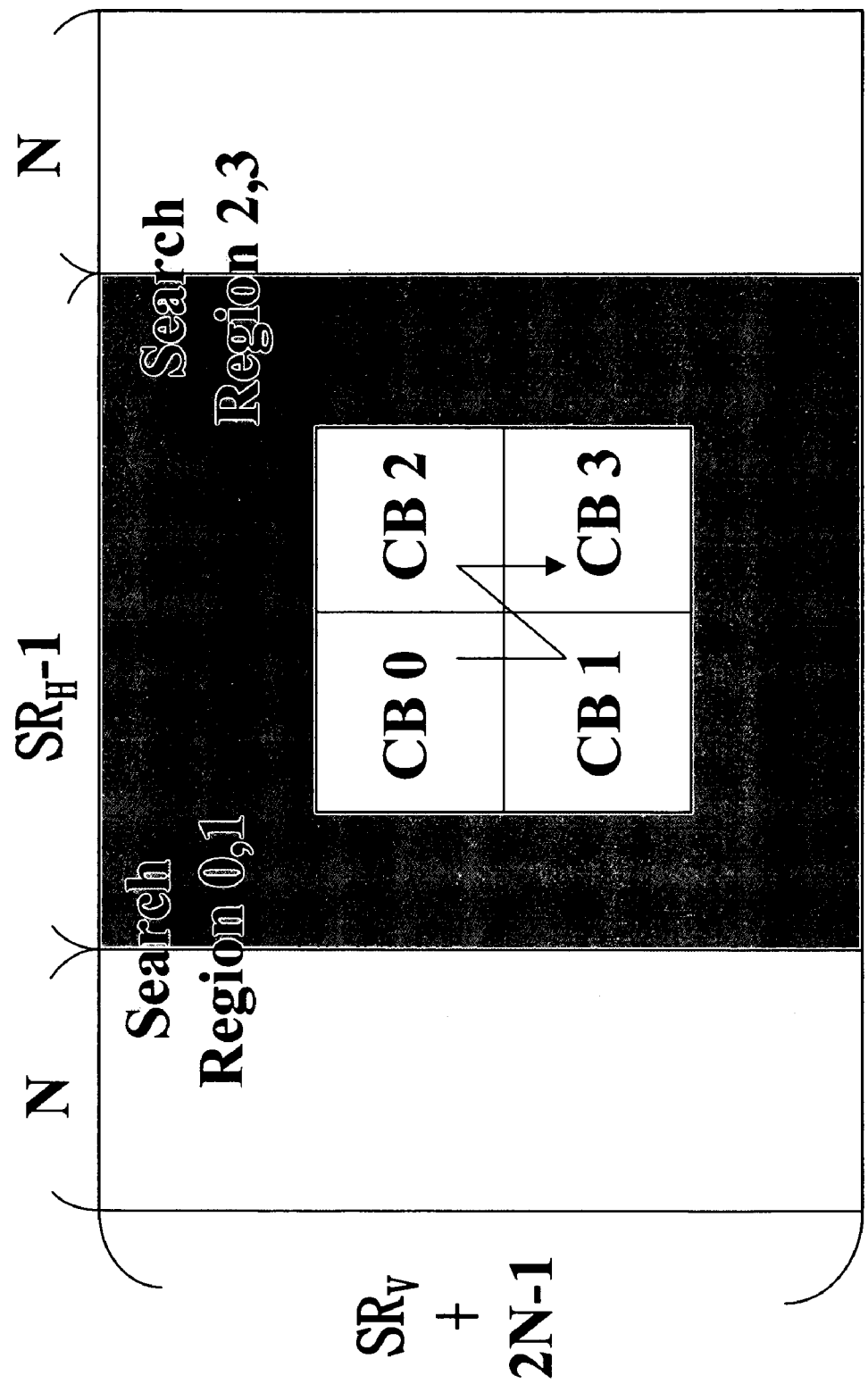
FIG. 4 illustrates a data reuse method with level C+ in full-search block matching algorithm according to the embodiment of the present invention.

Meanwhile the step (1) and step (2) are introduced to partly reuse the overlapped searching region in the vertical direction in the period of motion estimation for consecutive blocks in vertical direction; and the step (3) and step (4) are introduced to completely reuse the overlapped searching region in the horizontal direction in the period of motion estimation for consecutive blocks in horizontal direction. For n=2, FIG. 4 illustrates the procedure from step (1) to step (4).

Therefore, n consecutive blocks in vertical direction could be connected together. When a searching region for motion estimation is loaded, the corresponding searching range of n consecutive present block in vertical direction should be loaded simultaneously. For each n consecutive blocks, the data reuse method with level C+ merely has to load $B_H \times (SRv+n \times Bv-1)$ pixels for proceeding motion estimation, wherein $B_H$ is the width of block in horizontal direction, Bv is the height of block in vertical direction, SRv is pixel-searching range in vertical direction of block.

For reusing the loaded data of the searching region, the data reuse method with level C+ tends to store the corresponding searching region of several consecutive blocks in vertical direction into the internal memory. While there is merely a searching region of single-column present blocks stored, the internal memory only has to provide size for $(SR_H+B_H-1) \times (SRv+n \times Bv-1)$ pixels. On the other hand, In order to match all kinds of standards of coding audio-visual information, the data reuse method with level C+ could adjust the size of the internal memory according to the scheduling of hardware accelerator for matching the corresponding standard of coding audio-visual information. It tends to increase the width of the internal memory in horizontal direction and presents the size of the internal memory as $(SR_H+m \times B_H-1) \times (SRv+n \times Bv-1)$, wherein n is a parameter for searching region in vertical direction of data reuse method with level C+, m is designed according to the scheduling of corresponding hardware accelerator for matching the standard of coding audio-visual information, and n and m are both positive integrals.

4. Comparison of Efficiency

In this paragraph, the data reuse method with level C+ is compared with the data reuse methods with level C and D in hardware of full-search block matching algorithm. Meanwhile, the comparison of all kinds of data reuse methods includes the loading bandwidth of external frame memory and the size of internal memory. For comparing all kind of data reuse methods equitably, the size of internal memory is presented as the storage number of pixels. Additionally, the loading bandwidth of external frame memory is presented as a redundancy access factor (Ra) for comparing, wherein Ra is defined as the following:

$$Ra = \frac{\text{Total memory bandwidth for reference frame}}{\text{Minimum memory bandwidth (pixel count in total)}} \quad (2)$$

The Ra values of data reuse methods with level C and level C+ could be obtained via the equation (2).

$$Ra_{LevelC} \approx \frac{B_H \times (SR_V + B_V - 1)}{B_H \times B_V} \approx 1 + \frac{SR_V}{B_V} \quad (3)$$

$$Ra_{LevelC+} \approx \frac{B_H \times (SR_V + nB_V - 1)}{B_H \times nB_V} \approx 1 + \frac{SR_V}{nB_V} \quad (4)$$

The comparing result of three kinds of data reuse methods is illustrated in Table 1. According to the Table 1, the present invention provides the preferred data reuse method with level C+ instead of data reuse methods with level C and D according the prior art. While the n parameter of data reuse method with level C+ is constant and the searching region is larger, the data reuse method with level C+ could reduce the bandwidth of external frame memory by means of introducing parts of internal memory for extra storing.

TABLE 1

The comparing result of bandwidths for external frame memory and sizes of internal memory according to different data reuse methods in hardware of full-search block matching algorithm

| Varieties of levels | Ra (Pixels/pixel) | Size of internal memory (Pixels) |
|---|---|---|
| Level C  | $1 + SR_V/B_V$  | $(SR_H + B_H - 1) \times (SR_V + B_V - 1)$ |
| Level C+ | $1 + SR_V/nB_V$ | $(SR_H + B_H - 1) \times (SR_V + nB_V - 1)$ |
| Level D  | 1               | $(SR_H + W - 1) \times (SR_V - 1)$ |

Ra: Redundancy Access Factor

For example, in H.264/AVC standard of coding audio-visual information, the target resolution is HDTV 1280×720 pixels, and each second includes 30 frames. In order to compare the difference between the data reuse methods with level C and D, and the data reuse method with level C+ of the present invention, five frames are introduced for coding audio-visual information. The comparing result is shown in Table 2. In Table 2, the searching regions of two adjacent blocks in horizontal direction are stored simultaneously for match H.264/AVC standard. According to the result of Table 2, the data reuse method with level C+ of the present invention provides preferred data reuse method in the practical audio-visual-coding condition.

TABLE 2

The comparing result of bandwidths for external frame memory and sizes of internal memory according to different data reuse methods, wherein M in normal condition is the number of referred frames, the frame in this case includes 1280 × 720 pixels, each second includes 30 frames, 5 frames are introduced for referring, and the motion estimation is performed in conditions of $B_H = B_V = 16$, $SR_H = SR_V = 64$, $B_{H,C+} = 2 B_H$, $B_{V,C+} = 2 B_V$.

| | Normal condition | | HDTV720p 5 ref. frame | |
|---|---|---|---|---|
| Scheme | Bandwidth of external frame memory (pixels/pixel) | Required internal memory (pixels) | Bandwidth of external frame memory (MB/sec) | Required internal memory(KB) |
| Level C | $1 + M \times Ra_{Level\ C}$ | $(SR_H + B_H - 1) \times (SR_V + B_V - 1)$ | 718.8 | 31.2 |
| Level D | $1 + M$ | $(W + SR_H - 1) \times (SR_V - 1)$ | 165.9 | 423.0 |
| Proposed Level C+ | $1 + M \times Ra_{Level\ C+}$ | $(SR_H + B_{H,C+} - 1) \times (SR_V + B_{V,C+} - 1)$ | 442.4 | 45.1 |

In conclusion, the present invention provides a data reuse method with level C+, which is capable of completely reusing overlapped searching region in the horizontal direction while the total searching region of each block is loaded, and partly reusing the overlapped searching region in the vertical direction, thereby the method with level C+ data reuse method saving more bandwidth for external frame memory than that of C data reuse method does, wherein a small internal memory size is increased merely. On the other hand, the data reuse method with level C+ is independent of standard of coding audio-visual information, and can be adjusted according to different standards of coding audio-visual information for matching all present standards. Accordingly, the present invention possesses many outstanding characteristics, effectively improves upon the drawbacks associated with the prior art in practice and application, bears novelty, and adds to economical utility value. Therefore, the present invention exhibits a great industrial value.

While the invention has been described in terms of what is presently considered to be the most practical and preferred embodiments, it is to be understood that the invention needs not be limited to the disclosed embodiment. On the contrary, it is intended to cover various modifications and similar arrangements included within the spirit and scope of the appended claims, which are to be accorded with the broadest interpretation so as to encompass all such modifications and similar structures.

What is claimed is:

1. A data reuse method for block matching motion estimation, comprising:
   introducing blocks for motion estimation;
   using a region overlapped in the horizontal direction and the vertical direction corresponding to a searching region of adjacent blocks for reducing loading data from an external frame memory; and
   storing temporarily data of said searching region for motion estimation into an internal memory, thereby $B_H \times (SRv+n \times Bv-1)$ pixels being loaded from said external frame memory for n consecutive blocks in the vertical direction, where n is a natural number and larger than 1, $B_H$ is a width of said block in the horizontal direction, Bv is a height of said block in the vertical direction, and SRv is a pixel-searching range in the vertical direction of said block.

2. The data reuse method according to claim 1, wherein said internal memory has a capacity adjusted with scheduling of motion estimation in a video encoder.

3. The data reuse method according to claim 1, wherein said external frame memory further connects with a system bus when said motion estimation is performed.

4. The data reuse method according to claim 1, wherein said internal memory is a direct-connecting memory device when said motion estimation is performed.

* * * * *